United States Patent

Lojkutz et al.

[15] 3,647,227
[45] Mar. 7, 1972

[54] TWIN TAKE-APART HIGH-TEMPERATURE SHAFT SEAL

[72] Inventors: Bruno V. Lojkutz; Dale J. Warner, both of Chicago; George H. Schulz, Naperville, all of Ill.

[73] Assignee: Gits Bros. Mfg. Co., Chicago, Ill.

[22] Filed: May 15, 1970

[21] Appl. No.: 37,652

[52] U.S. Cl................................................277/40, 277/87
[51] Int. Cl.........................................................F16j 15/02
[58] Field of Search..................................277/40, 39, 85, 87

[56] References Cited

UNITED STATES PATENTS

| | | | |
|---|---|---|---|
| 3,319,968 | 5/1967 | Yost | 277/40 |
| 3,278,191 | 10/1966 | Gits et al | 277/40 |
| 3,218,110 | 11/1965 | Conner | 277/85 X |
| 2,593,899 | 4/1952 | Krug | 277/40 |
| 2,479,968 | 8/1949 | Schick | 277/40 UX |

*Primary Examiner*—Samuel B. Rothberg
*Attorney*—Hill, Sherman, Meroni, Gross & Simpson

[57] ABSTRACT

A face-type high-temperature resisting shaft seal which can be disassembled without removal of its outer shell or casing from a housing, gearbox or the like in which it is pressed and having a unitary multiple-part inner seal assembly which is easily separated into its components after removal from the shell or casing. The casing is U-shaped, opening in an axial direction, and has one or more keys lugs extending longitudinally on the inner face of the outer wall, each with a crosshead at its outer end. The inner assembly includes an adapter ring with a slot or keyway for each lug wide enough to clear the crosshead. The adapter is retained in the casing by the crosshead when rotated to abut one side of the keyway with the lug. The adapter carrier a carbon seal nose projecting from the casing to ride on the face of an adjoining mating ring. A J-shaped temperature-resisting plastic packing ring has the leg portion thereof sealed against the adapter ring with an elastomeric O-ring and the hooked portion thereof loaded by a garter spring against the inner surface of the inner peripheral wall of the casing. A ferrule ring fits in the adapter and is pressed by a wave spring against the elastomer O-ring to seal the J-packing against the adapter ring. This ferrule has one or more radially projecting ears fitting in a groove at the back end of the adapter ring and this groove is slotted at intervals to permit assembly of the ferrule into the adapter. Thus each of the components of the inner assembly can be separated by rotating the ferrule to a align the ears thereof with the gaps in the adapter permitting the ferrule to drop out of the adapter.

8 Claims, 4 Drawing Figures

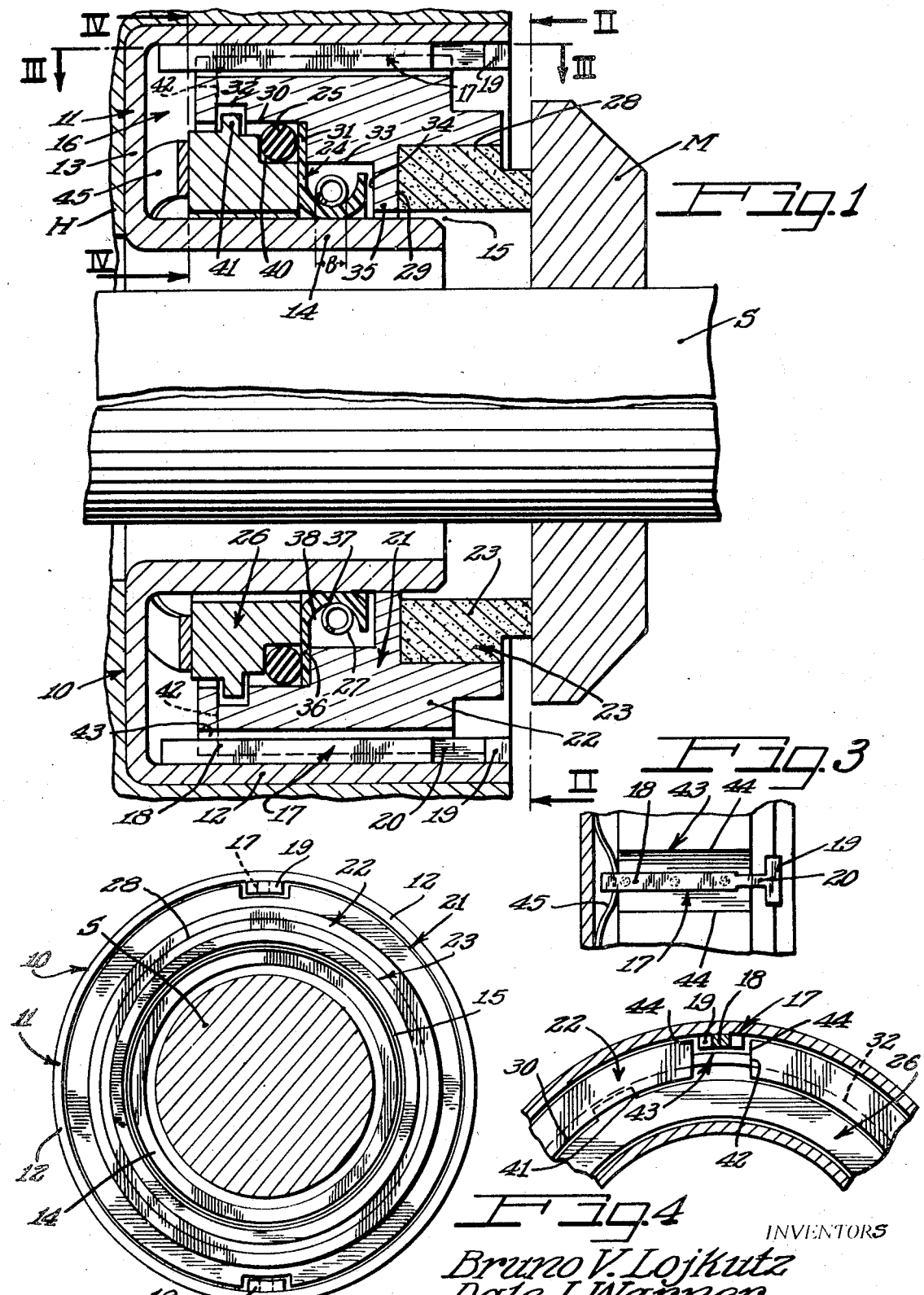

TWIN TAKE-APART HIGH-TEMPERATURE SHAFT SEAL

BACKGROUND OF THE INVENTION

1. Field of the Invention

This invention relates to the face-type shaft seal art, and more particularly to a face-type shaft seal which has an inner multiple-component assembled unit which can be easily separated into its component parts after removal from the casing.

2. Description of the Prior Art

Take-apart face-type shaft seals heretofore known have had seperable components in the casing or shell which would not remain in assembled relation when removed from the shell, or the components could not be separated without destroying at least some of them.

SUMMARY OF THE INVENTION

The present invention now provides a take-apart face-type shaft seal with a multicomponent assembly which is easily removed from the casing or shell without requiring removal of the casing from its installed position in a bearing housing or the like and which, after removal from the casing, can easily be disassembled for replacement of damaged or worn parts. The assembly of the components includes an adapter ring carrying the carbon seal ring or nose of the seal, a "Teflon" J-shaped packing ring with a garter spring therearound loading it into sealing engagement with the casing, an elastomeric O-ring sealing the J-ring to the adapter, and a backup ring or ferrule confining the o-ring. The adapter has an internal groove adjacent its backface which has one or more entrance slots through the backface of the ring. The backup ring or ferrule has one or more radially projecting ears or tangs which can pass through the slots into the groove for retaining the backup ring in assembled relation with the adapter when the ears are rotated in the groove out of registry with the slots.

The casing or shell is U-shaped in cross section with an axial opening receiving the assembly. A wave spring is dropped into the casing to press the assembly toward the open end of the casing for projecting the sealing nose from the casing.

The inner surface of the outer periphery of the shell or casing has longitudinally extending lugs or keys. The outer periphery of the adapter has keyways substantially wider than these keys. Crossheads or lugs at the outer ends of the keys shorter than the widths of the keyways serve to retain the assembly in the casing whenever the assembly is rotated to move a sidewall of the keyway against a key or lug thereby placing the keyway out of registration with the crosshead.

In use, the shell or casing may be pressed into a housing, gear box or the like and whenever any of the sealing parts need replacement, the inner assembly can easily be removed from the casing by moving the keyways into position for clearing the crossheads. The entire assembly in the casing, with the possible exception of the wave spring, is removed in one unitary part with all of the components intact. Then, the removed assembly is easily taken apart by rotating the backup ring or ferrule so that its ears or tangs register with the slots in the adapter. All of the remaining components in the adapter are then easily removed.

A feature of the invention resides in the provision of an elastomeric ring resiliently loading the Teflon J-ring into sealed engagement with the adapter.

Another feature of the invention includes the spring loading of the backup ring to move independently of the adapter ring for loading the elastomeric backup ring.

It is then an object of this invention to provide a face-type shaft seal with a unitary multiple-component assembly that is easily removed from the seal casing and then easily separated into its component parts.

A further object of this invention is to provide a twin take-apart face-type shaft seal including a casing of U-shaped cross section with an axial opening, a seal assembly slidably mounted in the casing and composed of a plurality of components, retaining means for holding the assembly in the casing in one position and for accommodating removal of the assembly through the open end of the casing in another position, and retaining means in the back end of the assembly holding the assembly components together in one position and permitting separation of the components in another position.

A further object of this invention is to provide a shaft-type seal with a spring-loaded assembly of components held in unitary relationship by a backup ring which is readily removed to give easy access to all of the components.

A specific object of the invention is to provide a face-type shaft seal with a U-shaped casing slidably supporting a multiple-component seal assembly with a seal nose projecting from the open end of the casing, a Teflon "J" packing ring in the assembly sealed against the casing, an O-ring sealing the J-ring to the assembly, a backup ring loading the O-ring, and groove and lug means retaining the backup ring in the assembly in one position and accommodating easy removal of the backup ring from the assembly to expose the component parts in another position.

Other and further objects of this invention will become apparent to those skilled in this art from the following detailed description of the annexed sheet of drawings which, by way of a preferred example, illustrates one embodiment of the invention.

BRIEF DESCRIPTION OF THE DRAWINGS

FIG. 1 is a cross-sectional view of a face-type shaft seal of this invention received in a shaft housing with a shaft projecting therethrough;

FIG. 2 is a plan view of the open front end of the seal of FIG. 1 taken along the line II—II of FIG. 1;

FIG. 3 is a fragmentary view taken along the line III—III of FIG. 2; and

FIG. 4 is a back plan view taken along the line IV—IV of FIG. 1.

DESCRIPTION OF THE PREFERRED EMBODIMENT

The seal assembly 10 of this invention is shown in FIG. 1 as received in a housing H around a shaft S and engaging a mating ring M on the shaft.

The seal assembly 10 has an annular metal casing or shell 11 of U-shaped cross section with an axial opening in one side face. This casing 11 has an outer periphery 12 pressed in the housing H, a radial backwall 13 bottomed on a shoulder in the housing, an inner peripheral wall 14 parallel with the wall 12 and spaced around the shaft S, and an annular open side or end 15 adjacent the mating ring M. The outer peripheral wall 12 is preferably longer than the inner peripheral wall 14. The casing 11 thus defines an annular chamber 16 closed at the back end by the wall 13 and open at the front end 15.

A pair of lugs or keys 17 are secured to the inner wall of the outer periphery 12 of the casing in diametric opposed position. Each lug has an elongated key or leg portion 18 extending axially from closely adjacent the back wall 13 to the open front 15 of the casing. The lug has a crosshead 19 underlying the extremity of the outer peripheral wall 12 and following the circular contour of the wall beyond both longitudinal edges of the key portion 18.

As shown in FIG. 3, a reduced width neck portion 20 is provided between the front end of the key 18 and the backface of the crosshead 19. These T-shaped lugs 17 retain the seal parts in the casing and prevent rotation thereof, as will be more fully hereinafter described.

According to this invention, a seal assembly 21 is slideably mounted in the chamber 16 of the casing 11. This assembly includes a metal adapter ring 22, a carbon ring or nose 23, a J-shaped plastic packing ring 24, an elastomeric O-ring 25, and a backup ring or ferrule 26. A metal garter spring 27 is seated in the hook end of the J-shaped packing ring 24.

The carbon ring 23 is pressed into a cylindrical bore 28 in the front face of the adapter ring 22 and bottomed against a radial shoulder 29 at the inner end of the bore. The carbon ring may be adhesively united to the bore and back wall. The carbon ring has a reduced diameter rib or nose portion providing a radial face riding on the adjacent radial face of the mating ring M.

The rear end of the adapter ring 22 has a stepped axial bore with a large-diameter cylindrical portion 30 extending from the backface of the ring to a radial shoulder 31 and having an annular groove 32 between the backface and shoulder. A smaller diameter bore portion 33 extends from the radial inner end of the shoulder 31 to a radial shoulder 34 paralleling the shoulder 29. The smallest inner diameter of the ring 22 is larger than the diameter of the inner peripheral wall 14 of the casing 11 as shown at 35 so that the ring freely embraces the inner wall of the casing.

The J-shaped packing ring 24 is preferably composed of a high temperature resisting plastic such as Teflon (polytetrafluoroethylene) and has a radial leg 36 fitting in the bore 30 of the ring 22 and bottomed on the shoulder 31 thereof. This leg extends radially to a hook-shaped portion 37 which is somewhat thicker than the leg and provides an annular cradle or recess 38 for the garter spring 27. The inner peripheral surface of this hook portion 37 has a relatively wide band area contact with the inner surface of the inner peripheral wall 14 of the casing as shown at B to provide a substantial seal area engagement with the casing.

The O-ring 25 of elastomeric material such as a high temperature resisting synthetic rubber or plastic fits in the bore 30 and is bottomed against the leg 36 of the packing ring 24.

The backing ring or ferrule 26 has an outer diameter freely fitting in the bore 30 of the adapter ring and an inner diameter freely embracing the inner wall 14 of the casing. The forward outer peripheral corner of the backup ring 26 is notched at 40 to provide a seat for the O-ring 25. A pair of radially projecting ears or tangs 41 narrower than the groove 32 are adapted to fit freely in this groove and are provided in 180° relation on the periphery of the backup ring.

As shown in FIG. 4, the back face of the adapter 22 has diametrically opposed radial slots 42 cut therein to adapt registering with the groove 32 and these slots are wide enough to receive the ears 41 of the backup ring 26. When, as shown in FIG. 4, the backup ring is rotated to move the ears 41 out of registration with the slots such as 42, the assembly will be held together and a unitary mounting of the seal components is provided.

The outer periphery of the adapter ring 22 has wide axial slots 43 in diametrically opposed relation extending across the full width of the adapter ring. These slots 43 are wider than the crossheads 19 of the lugs 17 so that when the slots and crossheads are in alignment the adapter ring 22 easily slides into the chamber 16 of the casing.

The slots 43 provide axial shoulders 44 for abutting against the key portions 18 of the lugs 17 to hold the assembly against rotation in the casing. Of course, whenever the assembly is so rotated as to offset the slots 43 from full registration with the crossheads 19, these crossheads will be effective to retain the assembly in the casing. Rotation of the shaft S automatically drives the assembly so that the shoulders 44 will engage one face or the other of the key 18.

A wave spring or washer 45 is bottomed on the end wall 13 of the casing and surrounds the inner peripheral portion 14 to engage the backface of the backup ring or ferrule 26 thereby urging the entire assembly toward the open end 15 of the casing to cause the nose of the carbon ring 23 to sealingly engage the radial face of the mating ring M. Free axial movement of the assembly in the casing is insured because the appreciable length of the key portions 18 and the cooperating shoulders 44 of the slots 43 prevent high unit loading. In addition, the reduced neck portion 20 prevents any "hang-up" in the forward movement of the assembly against the mating ring.

The spring 45 also loads the backup ring 26 against the elastomeric O-ring 25 which in turn sealingly presses the leg 36 of the "J" packing ring against the shoulder 31.

From the above descriptions, it will therefore be clearly understood that the assembly is removed from the open end 15 of the casing by aligning the slots 43 with the crossheads 19 and that the removed assembly may be disassembled by aligning the ears 41 of the backup ring 26 with the slots 42.

Removal of the backup ring 26 from the assembly gives easy access to all of the components, permitting replacement, for example, of worn or damaged O-ring, packing ring and garter spring components.

We claim as our invention:

1. A twin take-apart shaft seal comprising an annular casing of U-shaped cross section having an axially open end, a multicomponent seal assembly slidably mounted in said casing, a spring in said casing urging said assembly toward the open end of the casing, coacting means on one component of said seal assembly and on said casing accommodating insertion of the seal assembly through said open end when aligned and retaining the one component of the seal assembly in the casing when misaligned, and coacting means between said one component and a second of said components of said assembly retaining the one and said second components in assembled unitary relation when the said one and the said second components are in a given position relative to one another, and accommodating separation of the components in another position.

2. A face-type shaft seal comprising a shell defining an annular chamber open at one axial end, a multicomponent seal ring assembly slidably mounted in said chamber, said shell having an axially extending key with a circumferentially extending head projecting into the outer peripheral portion of said annular chamber, said seal assembly having an axially extending groove wider than said head to accommodate insertion of the assembly into the chamber and providing shoulders along the length of the groove for abutting said key, said seal assembly including a backup ring holding the components in assembled relation, and interfitting slotted groove and tang means securing the backup ring in the assembly in one position and accommodating separation of the backup ring from the assembly in another position whereby the assembly can be inserted into the annular chamber as a unit, retained therein during use, removed therefrom for repair and separated after removal into its constituent components.

3. A face-type seal comprising an annular casing having an outer peripheral wall adapted to be press-fitted and retained in a housing, a radial backwall, and an inner peripheral wall parallel with the outer wall and of less axial height than the outer wall, said casing defining an annular chamber closed at one axial end by said backwall and open at the other axial end, said outer peripheral wall of the casing having diametrically opposed T-shaped lugs secured to the inner surface of the outer peripheral wall of the casing, each with an elongated leg portion extending axially across substantially the entire length of said outer wall and a crosshead at the open end extremity of the outer wall, a seal assembly slidably mounted in said annular chamber of the casing having an adapter ring with diametrically opposed axial slots wide enough to clear the crosshead on the lugs and providing shoulders for abutting the axial legs of the lugs to hold the assembly against rotation while accommodating sliding movement of the assembly, the crossheads of the lugs being effective to abut the adapter ring and retain the assembly in the casing when the slots are moved out of registry with the crossheads, said adapter ring carrying a carbon seal ring at the outer end thereof for projecting from the casing, a J-shaped packing ring in said adapter ring having a hook portion on the inner peripheral wall of the casing, a garter spring loading said hook portion on said inner peripheral wall, a backup ring in said adapter ring, an elastomeric ring between the adapter ring and the leg of the packing ring sealing the packing ring against the adapter ring, said adapter ring having an internal annular groove adjacent the rear end thereof, diametrically opposed slots in the backface of the adapter ring communicating with said groove, said backup ring having radially projecting ears fitting said slots and projecting into said groove to retain the backup ring in the adapter when rotated out of alignment with the slots, and a wave spring between the radial wall of the casing and the adapter urging the assembly towards the open end of the casing and urging the backup ring against the elastomeric ring to seal the leg of the packing ring against the adapter ring.

4. The seal of claim 1 including a packing ring in the seal assembly engaging the inner peripheral wall of the casing.

5. The seal of claim 1 wherein the seal assembly includes an adapter ring, a carbon seal ring carried by the front end of the adapter ring, a J-shaped packing ring inside of the adapter ring for sealingly engaging the inner peripheral wall of the casing, an elastomer ring overlying the leg of the J-shaped packing ring, and a removable backup ring compressing the elastomer ring to seal against the packing ring.

6. The seal of claim 5 wherein the J-shaped packing ring has a garter spring in the hook portion thereof loading a band area of the hook portion into sealing engagement with the inner peripheral wall of the casing.

7. The seal of claim 2 wherein the seal assembly includes an adapter ring with an internal annular groove adjacent the back end thereof, a slot in the back face of the adapter ring giving access to said groove, and a backup ring in the adapter ring having an ear fitting said slot and retained in said groove when rotated out of registration with the slot to assemble the backup ring with the adapter ring.

8. The seal assembly of claim 2 wherein the lug has a reduced width portion in the leg thereof behind the crosshead to facilitate free movement of the assembly toward the open end of the annular chamber.

* * * * *